(12) United States Patent
Silverstein et al.

(10) Patent No.: US 10,957,196 B2
(45) Date of Patent: Mar. 23, 2021

(54) TRAFFIC REDIRECTION FOR AUTONOMOUS VEHICLES

(71) Applicant: International Business Machines Corporation, Armonk, NY (US)

(72) Inventors: Zachary A. Silverstein, Austin, TX (US); Robert Huntington Grant, Atlanta, GA (US); Trudy L. Hewitt, Cary, NC (US); Jeremy R. Fox, Georgetown, TX (US)

(73) Assignee: International Business Machines Corporation, Armonk, NY (US)

(*) Notice: Subject to any disclaimer, the term of this patent is extended or adjusted under 35 U.S.C. 154(b) by 51 days.

(21) Appl. No.: 16/373,874

(22) Filed: Apr. 3, 2019

(65) Prior Publication Data

US 2020/0320876 A1    Oct. 8, 2020

(51) Int. Cl.
| | | |
|---|---|---|
| G08G 1/09 | (2006.01) | |
| G08G 1/01 | (2006.01) | |
| G05G 1/02 | (2006.01) | |
| G05G 1/00 | (2006.01) | |
| G08G 1/16 | (2006.01) | |
| G08G 1/0967 | (2006.01) | |
| G05D 1/02 | (2020.01) | |
| G05D 1/00 | (2006.01) | |

(52) U.S. Cl.
CPC ..... *G08G 1/096775* (2013.01); *G05D 1/0088* (2013.01); *G05D 1/0276* (2013.01); *G08G 1/0145* (2013.01); *G08G 1/096725* (2013.01); *G08G 1/167* (2013.01); *G05D 2201/0213* (2013.01)

(58) Field of Classification Search
CPC ............ G08G 1/096775; G08G 1/167; G08G 1/0145; G08G 1/096725; G05D 1/0276; G05D 1/0088; G05D 2201/0213
See application file for complete search history.

(56) References Cited

U.S. PATENT DOCUMENTS 9,060,342 B2 * 6/2015 Wu ....................... H04W 64/00
9,201,421 B1 12/2015 Fairfield et al.
10,339,806 B2 * 7/2019 Hamada ........... G08G 1/096775
(Continued)

FOREIGN PATENT DOCUMENTS

KR 20180087968 A * 8/2018
WO 2017176550 A1 10/2017

OTHER PUBLICATIONS

Smartcone Technologies Inc., "Smart, IoT-based safety and monitoring Solutions for securing vulnerable and hazardous zones, large and small", printed Feb. 27, 2019, 8 pages, https://thesmartcone.com/.
(Continued)

*Primary Examiner* — Rodney A Butler
(74) *Attorney, Agent, or Firm* — James L. Olsen

(57) ABSTRACT

Aspects of the present disclosure relate to redirection of autonomous vehicles. Communication is initiated between a master node and an autonomous vehicle. A location of a new lane is then received from the master node, the new lane comprised of a plurality of lane nodes. Communication is then initiated between the plurality of lane nodes and the autonomous vehicle. The autonomous vehicle is then guided through the new lane by the plurality of lane nodes.

17 Claims, 6 Drawing Sheets

(56) References Cited

U.S. PATENT DOCUMENTS

| | | | |
|---|---|---|---|
| 2013/0297195 A1* | 11/2013 | Das | G08G 1/163 |
| | | | 701/117 |
| 2015/0154557 A1* | 6/2015 | Skaaksrud | G06Q 10/0833 |
| | | | 705/337 |
| 2016/0132705 A1 | 5/2016 | Kovarik et al. | |
| 2016/0231746 A1 | 8/2016 | Hazelton et al. | |
| 2017/0131712 A1 | 5/2017 | Ricci et al. | |
| 2017/0248963 A1 | 8/2017 | Levinson et al. | |
| 2017/0311125 A1* | 10/2017 | Hedley | H04W 4/023 |
| 2018/0183873 A1* | 6/2018 | Wang | H04L 67/12 |
| 2019/0171206 A1* | 6/2019 | Abrams | G01C 21/3461 |
| 2019/0329780 A1* | 10/2019 | Tomescu | B60W 30/09 |
| 2019/0391594 A1* | 12/2019 | Takano | G01C 21/3484 |
| 2020/0124698 A1* | 4/2020 | Noujeim | G01S 13/931 |

OTHER PUBLICATIONS

Smartcone Technologies Inc., "IoT Voices with Wired CEO Smart Cone Technologies", Uploaded on Dec 7, 2017, 2 pages, https://youtu.be/ME0PZDJMDb0.
Coyle, A., "SmartCone Technologies and IBM Enter Joint Initiative Agreement for IoT-based Safety Solutions", Press Release, printed Feb. 27, 2019, 2 pages, https://www.pr.com/press-release/735817.
Pendleton et al., "Perception, Planning, Control, and Coordination for Autonomous Vehicles", Machines 2017, MDPI, Published: Feb. 17, 2017, 54 pages, www.mdpi.com/2075-1702/5/1/6/pdf.
Mell et al., "The NIST Definition of Cloud Computing", Recommendations of the National Institute of Standards and Technology, Sep. 2011, 7 pages.

* cited by examiner

TRAFFIC REDIRECTION FOR AUTONOMOUS VEHICLES

BACKGROUND

The present disclosure relates to autonomous vehicles and, more specifically, to redirecting routes of autonomous vehicles.

Autonomous vehicles are capable of traveling from a starting point to a destination with little to no user input. To achieve this, autonomous vehicles leverage sensor data from a variety of sensors to perceive their surroundings. Autonomous vehicles have a variety of benefits, including, among others, safety, efficiency, and customer satisfaction.

SUMMARY

Aspects of the present disclosure relate to a method, system, and a computer program product for redirection of autonomous vehicles. In embodiments, a computer-implemented method can be executed by one or more processing circuits of an autonomous vehicle. The computer-implemented method can comprise initiating communication with a master node. The method can further comprise receiving, from the master node, a location of a new lane, the new lane comprised of a plurality of lane nodes. The method can further include initiating, upon arrival to the location of the new lane, communication with the plurality of lane nodes. The method can further include receiving guidance facilitating travel through the new lane from the plurality of lane nodes.

In embodiments, a computer program product comprising a computer readable storage medium having program instructions can be executed by one or more processing circuits of an autonomous vehicle to perform a method. The method can comprise initiating communication with a master node. The method can further comprise receiving, from the master node, a location of a new lane, the new lane comprised of a plurality of lane nodes. The method can further include initiating, upon arrival to the location of the new lane, communication with the plurality of lane nodes. The method can further include receiving guidance facilitating travel through the new lane from the plurality of lane nodes.

In embodiments, a traffic redirection system including a master node and a plurality of lane nodes can be configured to perform a method. The method can include transmitting, by the master node, a location of a new lane to an autonomous vehicle, the new lane comprised of the plurality of lane nodes. The method can further include initiating a communication between the autonomous vehicle and the plurality of lane nodes. The method can further include guiding, by the plurality of lane nodes, the autonomous vehicle through the new lane.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
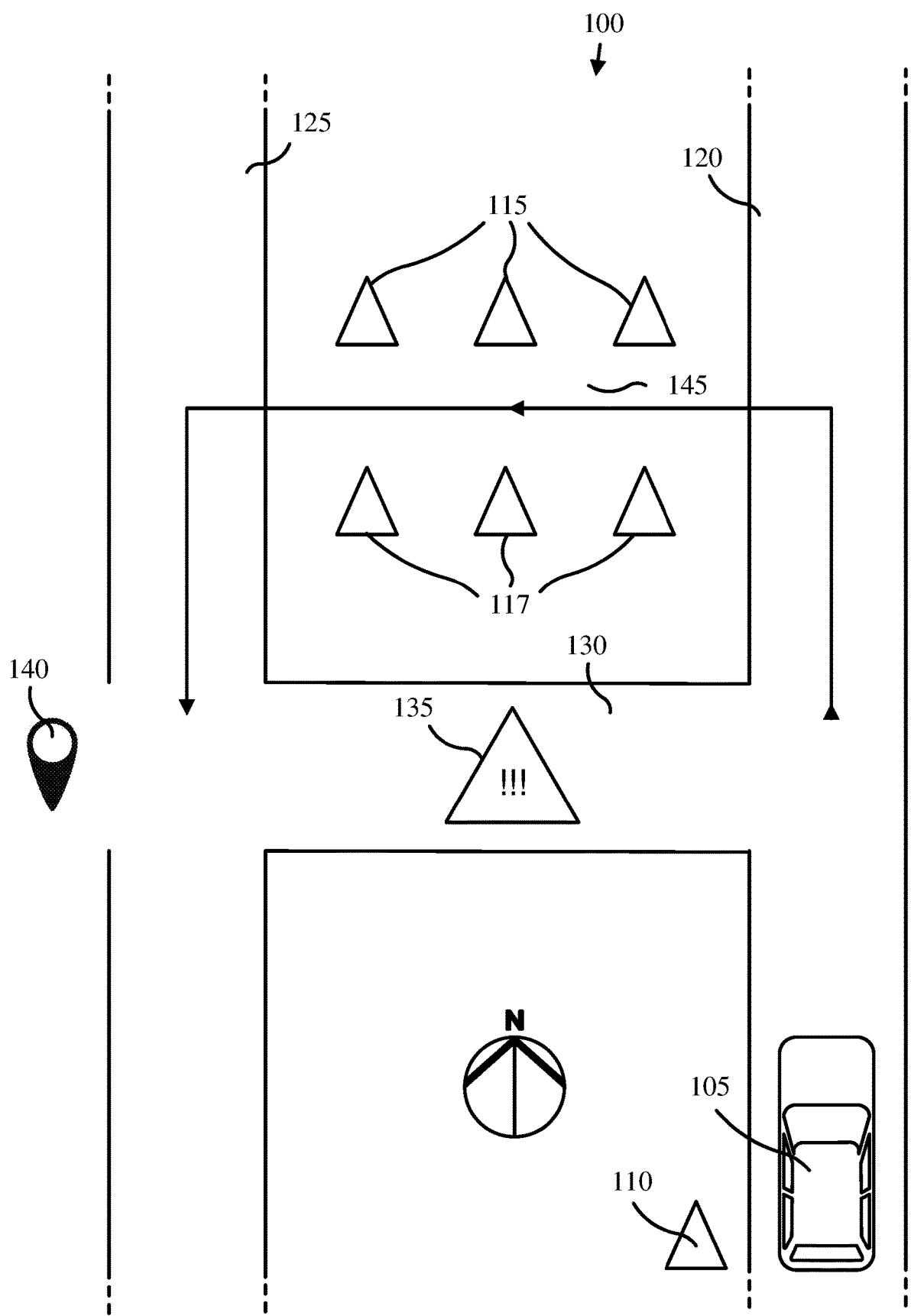
FIG. 1 is a block diagram illustrating a computing environment in which illustrative embodiments of the present disclosure can be implemented.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward autonomous vehicles, and more specifically, to redirecting routes of autonomous vehicles. While the present disclosure is not necessarily limited to such applications, various aspects of the present disclosure may be appreciated through a discussion of various examples using this context.

As autonomous vehicles (e.g., self-driving cars) become more popular, there is speculation regarding how they will adapt to rapidly changing traffic patterns such as new lane creations and detours. Autonomous vehicles often have excellent object detection systems to reduce collisions, and though this may help with avoiding imminent dangers, it may not help with rerouting a vehicle (e.g., to a safer route). Though navigation systems exist which can guide autonomous vehicles through detours, they do not account for the generation of new lanes where roads did not previously exist. While the possibility for manual intervention exists, aspects of the present disclosure recognize the need for a solution which allows the vehicle to operate autonomously.

Aspects of the present disclosure address the aforementioned complications by enabling the redirection of autonomous vehicles via a traffic redirection system. The traffic redirection system can include a master node and a plurality of lane nodes. As an autonomous vehicle approaches (e.g., is within a particular distance of) the master node, the master node transmits a location of a new lane to the autonomous vehicle, the new lane dictated by the plurality of lane nodes. The vehicle then travels to the location of the new lane and initiates communication (e.g., over a network) with the plurality of lane nodes. The lane nodes then guide the autonomous vehicle through the lane (e.g., by transmitting a temporary lane guidance rule set to the autonomous vehicle). Upon passing through the new lane, the autonomous vehicle can resume travel to its destination using built in self-driving instructions.

The traffic redirection system allows the autonomous vehicle to traverse through a newly generated lane without manual intervention. This is particularly advantageous because, as autonomous vehicles approach Society of Automotive Engineers (SAE) standardization level 5 (e.g., a metric that measures the level of autonomy of an autonomous vehicle, SAE level 5 indicates the maximum level of autonomy, no steering wheel required), there exists a need to complete all aspects of travel with no manual intervention. SAE level 5 can only be achieved if all roadway and environmental conditions capable of being managed by a human driver are capable of being managed autonomously. Accordingly, aspects of the present disclosure add to the capabilities for vehicles to operate entirely autonomously.

The aforementioned advantages are example advantages, and embodiments exist that can contain all, some, or none of the aforementioned advantages while remaining within the spirit and scope of the present disclosure.

Referring now to FIG. 1, shown is a diagram of a computing environment 100 in which illustrative embodiments of the present disclosure may be implemented. The computing environment 100 includes an autonomous vehicle 105 attempting to reach a destination 140.

As depicted in FIG. 1, the shortest route the autonomous vehicle 105 can take to the destination 140 is obstructed by a closure 135, which may have resulted from a car accident, an environmental hazard (e.g., a flood, land slide, volcanic activity, a fallen tree branch, etc.), construction, etc. As such, rather than taking a first road 120 (northbound, see compass) to a second road 130 (westbound) directly to the destination 140, the autonomous vehicle 105 may have to take the first road 120 northbound until another road can be taken westbound such that the autonomous vehicle 105 can take a third road 125 southbound to reach the destination 140. This leads to a greater distance traveled for the autonomous vehicle 105. Accordingly, rather than traveling farther north down the first road 120 and then south down the third road 125, a lane 145 is created between first road 120 and third road 125. The lane 145, comprised of a first set of cones 115 (e.g., comprising the northern border of the lane) and a second set of cones 117 (e.g., comprising the southern border of the lane), allows the autonomous vehicle 105 to reach the destination 140 through a shorter path.

A user would typically have to manually control the autonomous vehicle 105 to traverse through the newly created lane 145, as the routing information and/or autonomous control operations may not be adapted to facilitate travel through the new lane 145. Accordingly, a master cone 110, the first set of cones 115, and the second set of cones 117 can aid the autonomous vehicle 105 in traversing through the new lane 145 without manual intervention.

As the autonomous vehicle 105 approaches the master cone 110, communication is established between the master cone 110 and autonomous vehicle 105 (e.g., via wireless communication, such as Bluetooth Low Energy (BLE) wireless technology). The master cone 110 then notifies the autonomous vehicle 105 of, and directs the autonomous vehicle 105 to, the new lane 145. For example, the master cone 110 can authenticate (e.g., using a cryptographic authentication method) with the autonomous vehicle 105 and notify the autonomous vehicle 105 of the new lane 145 traveling west bound. In embodiments, the master cone 110 can notify the autonomous vehicle 105 of the distance from and/or route to the new lane 145. In embodiments, the master cone 110 can indicate the location of the new lane 145 on a navigation system (e.g., a global positioning system (GPS)) of the autonomous vehicle 105. In some embodiments, the position of the lane 145 can be dynamically determined based on multilateration between the first set of cones 115, second set of cones 117 and the master cone 110. The location of the lane 145 can then be transmitted directly to the autonomous vehicle 105.

Upon traveling to the beginning of the new lane 145, the autonomous vehicle 105 can establish a wireless communication with the first set of cones 115 and second set of cones 117. The first set of cones 115 and second set of cones 117 can provide the autonomous vehicle 105 an indication of where the autonomous vehicle 105 is supposed to be with respect to the first set of cones 115 and second set of cones 117. For example, as the autonomous vehicle 105 begins traversing the new lane 145, the first set of cones 115 transmits a signal (e.g., possibly overwriting the autonomous vehicle's existing traffic rule set) which indicates that the autonomous vehicle 105 should be south of the first set of cones 115, and the second set of cones 117 transmits a signal which indicates that the autonomous vehicle 105 should be north of the second set of cones 117. Upon passing through the lane, the connection between the first set of cones 115, second set of cones 117, and master cone 110 can be severed. The autonomous vehicle 105 can then resume normal operation (e.g., by engaging its existing traffic rule set and navigation data) to reach the destination 140.

FIG. 1 is intended to represent the major components of an example computing environment according to embodiments of the present disclosure. In some embodiments, however, individual components can have greater or lesser complexity than shown in FIG. 1, and components other than, or in addition to those shown in FIG. 1 can be present. Furthermore, in some embodiments, various components illustrated in FIG. 1 can have greater, lesser, or different functionality than shown in FIG. 1. Further still, aspects of the present disclosure exist comprising only a subset of the components illustrated while remaining within the spirit and scope of the present disclosure. As an example, there may be one or more additional cones within the first set of cones 115 and second set of cones 117. In embodiments, additional master cones and/or severance cones (e.g., cones which sever connection between the autonomous vehicle 105 and the cones illustrated in FIG. 1, not shown). Further, "cones" can take any form, and do not necessarily have to be traffic cones. For example, cones can be substituted with reflectors, posts, poles, beacons, barriers, flags, etc.

Figure 2:
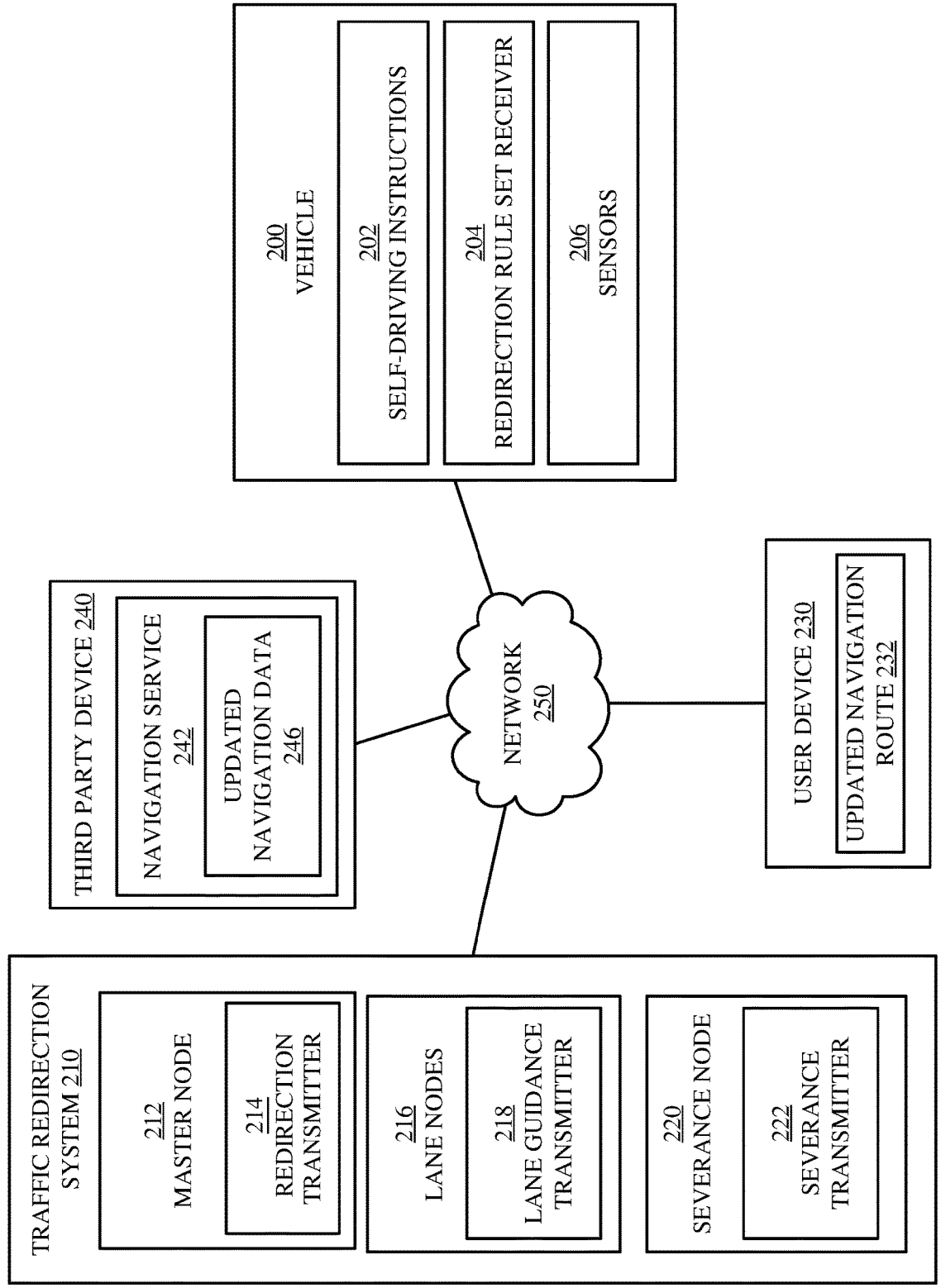
FIG. 2 is a block diagram illustrating an Internet of Things (IoT) environment including a traffic redirection system and an autonomous vehicle, in accordance with embodiments of the present disclosure.

Referring now to FIG. 2, illustrated is a block diagram of an example Internet of Things (IoT) environment according to aspects of the present disclosure. The IoT environment can include numerous components communicatively coupled by a network 250 such as, but not limited to, a vehicle 200, a traffic redirection system 210, a user device 230, and a third party device 240.

Vehicle 200 can comprise a semi-autonomous or fully autonomous vehicle, each possibly capable of fully manual operation according to various embodiments. Vehicle 200 can be a sedan, sport-utility-vehicle (SUV), truck, bus, all-terrain vehicle (ATV), aerial vehicle (e.g., plane, helicopter, quadcopter, etc.), train, ship (e.g., ferry, cruise liner, etc.), or a different form of vehicular transport.

Vehicle 200 includes self-driving instructions 202. The self-driving instructions 202 include traffic rules that the vehicle 200 must follow while traveling. For example, self-driving instructions 202 can include lane rules (e.g., specifying the correct side of the road, specifying that the car should remain in the center of a lane, etc.), light/sign rules (e.g., stop light rules, construction zone rules, school zone rules, yield, stop sign rules, etc.), acceleration/speed rules, situational rules (e.g., stopping during a school bus drop off, no right turns around a city bus), turning rules (e.g., yielding priority with multiple cars at an intersection), etc. In embodiments, the self-driving instructions 202 depend on the applicable traffic rules in the jurisdiction where the vehicle 200 is operating. For example, traffic rules in the United States differ from traffic rules in the United Kingdom (e.g., right vs. left handed traffic).

To follow the traffic rules set forth in the self-driving instructions 202, the vehicle 200 includes sensors 206. The sensors 206 continuously collect sensor data while the vehicle 200 is operating, and the sensor data is used to control the vehicle 200 (e.g., using proportional-integral-derivative (PID) control) by one or more processing circuits. The sensors 206 can include, but are not limited to, radar, computer vision, lidar, sonar, global positioning system (GPS), odometry, and inertial measurement units (IMUs). For example, computer vision may be used to recognize signage, brake lights, buses, traffic lines, etc., lidar can be used for object detection and avoidance, and GPS can be used for routing. Generally, processing circuits of vehicle 200 respond to the data collected by the sensors 206 to comply with the self-driving instructions 202.

The vehicle 200 includes a redirection rule set receiver 204 configured to receive a redirection rule set from the traffic redirection system 210. The traffic redirection system 210 can aid in guiding the autonomous vehicle through a detour (e.g., such as the detour depicted in FIG. 1). The traffic redirection system 210 includes a master node 212 (e.g., master cone 110 of FIG. 1), lane nodes 216 (e.g., collectively the first set of cones 115 and second set of cones 117 of FIG. 1) and a severance node 220. The rule set received by the redirection rule set receiver 204 may be appended to and/or override the self-driving instructions 202 temporarily.

The master node 212 redirects the vehicle 200 towards the lane nodes 216 (e.g., which comprise a detour lane) by a redirection transmitter 214. The redirection transmitter 214 transmits the location (e.g., GPS coordinates, route, etc.) of the lane nodes 216 to the redirection rule set receiver 204. The redirection rule set receiver 204 then uses the location to guide the vehicle 200 towards the lane nodes 216. For example, the redirection transmitter 214 can transmit GPS coordinates of the lane nodes 216 to the redirection rule set receiver 204 over network 250, and the vehicle 200 can then use the GPS coordinates to travel towards the lane nodes 216.

In embodiments, the master node 212 acquires the location of the lane nodes 216 using wireless technology. These wireless technologies include, but are not limited to, Wi-Fi, Bluetooth Low Energy (BLE), Radio-frequency Identification (RFID), and Ultra-wideband (UWB). Signals (e.g., speed, strength, and/or angle of signals) traveling between transmitters (e.g., the lane nodes 216) and receivers (e.g., the master node 212 or vehicle 200) can be used to approximate location. For example, Time Difference of Arrival (TDOA), Received Signal Strength Indicator (RSSI), and/or Angle of Arrival (AOA) can be used to approximate the position of the lane nodes 216. However, the master node 212 can determine the position of the lane nodes in any other suitable manner. For example, the lane nodes 216 can transmit their GPS coordinates to the master node 212.

In embodiments, the location of the lane nodes 216, which comprise the new lane, can be transmitted to the third party device 240 and implemented within a navigation service 242. The navigation service 242 can be updated such that the new lane is indicated within updated navigation data 246. The navigation service 242 can then utilize the location of the new lane to construct new routes and update corresponding route timing. The third party device 240 can transmit the updated navigation data 246 to the user device 230. The user device 230 (e.g., which may be the device a user of the vehicle 200 possesses) can then update an existing route with an updated navigation route 232.

Upon arrival to the lane nodes 216, a lane guidance transmitter 218 (e.g., associated with each lane node) guides the vehicle 200 through the lane nodes 216. The lane guidance transmitter 218 transmits the relative direction the vehicle 200 should be with respect to the lane nodes 216 to the redirection rule set receiver 204. The redirection rule set receiver 204 then appends the data received by the lane guidance transmitter 218 to (e.g., or overrides) the self-driving instructions 202 such the vehicle 200 remains within the lane. For example, as depicted in FIG. 1, lane guidance transmitters associated with the first set of cones 115 transmit that the vehicle 105 should be southbound of the first set of cones 115 (e.g., by more than a minimum distance and/or less than a maximum distance) and lane guidance transmitters associated with the second set of cones 117 transmit that the vehicle 105 should be northbound of the second set of cones 117 (e.g., by more than a minimum distance and/or less than a maximum distance). In embodiments, each lane node transmits a signal indicating the direction to which traffic is to be directed (e.g., which side of the lane node traffic is supposed to be on). In embodiments, the lane guidance transmitter 218 transmits a set of respective orientations the autonomous vehicle 200 is with respect to respective lane nodes of the plurality of lane nodes at a point in the new lane. In some embodiments, each lane node transmitter 218 transmits a minimum and/or maximum distance the vehicle 200 should be with respect to each lane node 216 as the vehicle 200 travels through the new lane.

The vehicle 200 utilizes the sensors 206 to comply with the lane guidance rules received by the redirection rule set receiver 204. For example, processing circuits of the vehicle 200 can analyze the sensor data to determine whether the vehicle 200 is in the correct position (e.g., direction, orientation, distance, and/or GPS coordinates) according to the lane guidance rules. If the processing circuits of the vehicle 200 determine that lane guidance rules are not followed, appropriate action can be taken (e.g., the car can be steered into a position within the lane nodes 216).

Upon traveling through the lane defined by the lane nodes 216, a severance node 220 terminates the communication between the vehicle 200 and the master node 212 and/or lane nodes 216. The severance node 220 includes a severance transmitter 222 configured to transmit a signal to initiate severance of the communication between the vehicle 200 and the traffic redirection system 210. Upon termination of the communication between the vehicle 200 and the traffic redirection system 210, the vehicle 200 can resume autonomous operation using the self-driving instructions 202.

It is noted that network 250 can comprise any physical or virtual network, including Wi Fi, broadband, cellular, short-range, and/or other networks. Although a single network is shown, multiple similar or dissimilar sub-networks may likewise be used to continuously or intermittently connect various components illustrated in FIG. 2. In some embodiments, components shown in FIG. 2 may communicate via ANT/ANT+, Bluetooth, cellular (e.g., 3G, 4G, 5G, etc.), infrared, 6LoWPAN, Ultra-wideband (UWB), long range RFID, Wi Fi, wirelessHART, and/or WirelessHD protocols. Further, in embodiments, data (e.g., location data, rule sets, etc.) can be encrypted (e.g., using one or more cryptographic hash functions) prior to transmission such that various communication mechanisms can be used without putting the data at risk.

FIG. 2 represents the major components of an example IoT environment according to embodiments of the present disclosure. In some embodiments, however, individual components can have greater or lesser complexity than shown in FIG. 2, and components other than, or in addition to those shown in FIG. 2 can be present. Furthermore, in some embodiments, various components illustrated in FIG. 2 can have greater, lesser, or different functionality than shown in FIG. 2. Further still, aspects of the present disclosure exist comprising only a subset of the components illustrated while remaining within the spirit and scope of the present disclosure. As an example, multiple vehicles may be communicatively coupled to the traffic redirection system 210.

In embodiments, functionalities of the various modules (e.g., the redirection rule set receiver 204, redirection transmitter 214, lane guidance transmitter 218, severance transmitter 222, etc.) can be processor executable instructions that can be executed by a dedicated or shared processor using received inputs.

Figure 3:
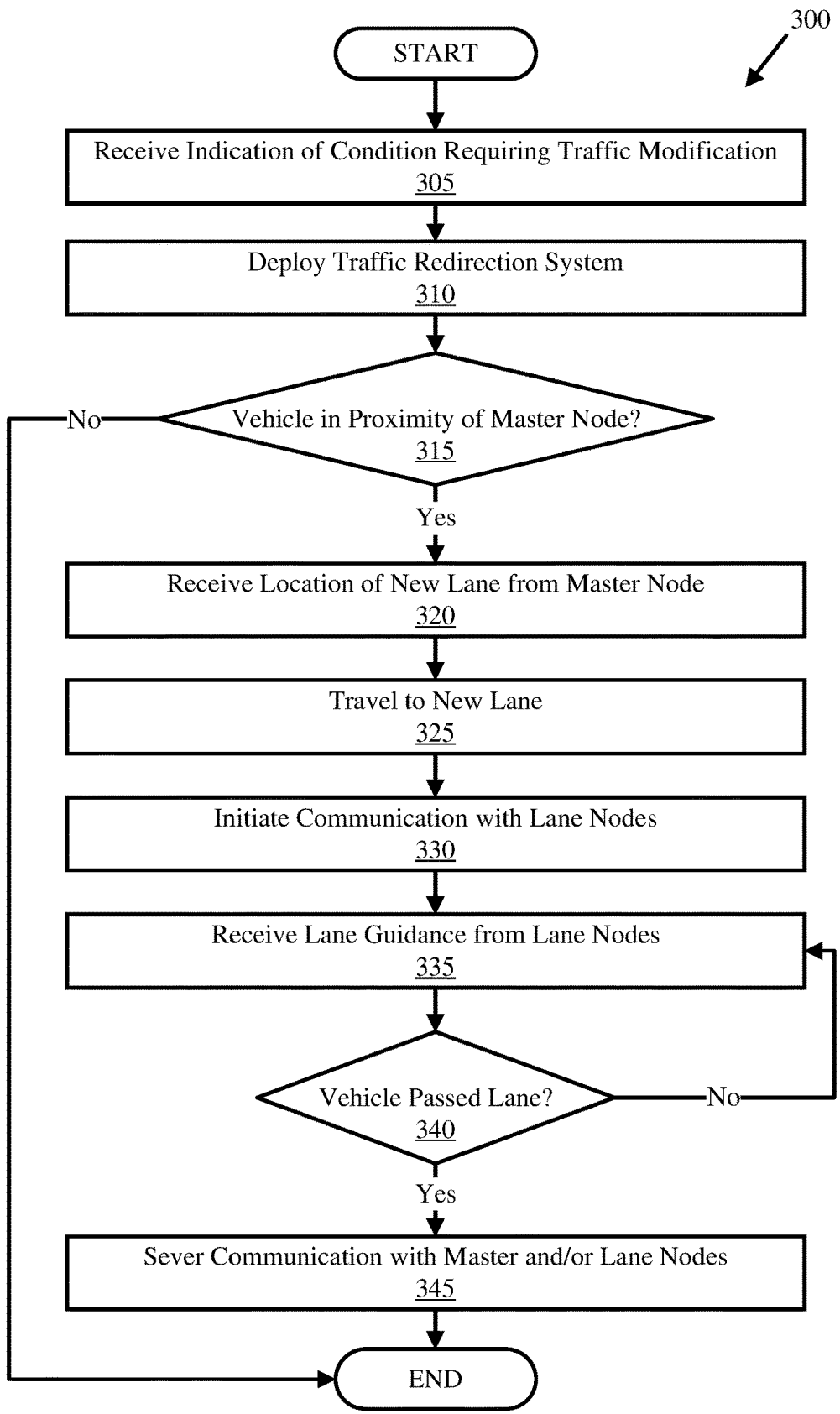
FIG. 3 is a flow diagram illustrating an example method for redirecting an autonomous vehicle, in accordance with embodiments of the present disclosure.

Referring now to FIG. 3, shown is a flow diagram illustrating an example method 300 for redirecting an autonomous vehicle (e.g., vehicles 105 and 200 of FIGS. 1 and 2, respectively), in accordance with embodiments of the present disclosure.

Method 300 initiates at operation 305, where an indication of a condition requiring a traffic modification is received. The indication can be received based on feedback provided from drivers and/or self-driving vehicles (e.g., a road is obstructed based on an accident or environmental hazard). In some embodiments, the indication can be received based on construction being initiated. An authority responsible for managing traffic (e.g., a police officer) can then facilitate traffic modification.

The traffic redirection system is then deployed. This is illustrated at operation 310. The traffic redirection system can be deployed by an authority responsible for managing traffic. In some embodiments, the traffic redirection system can be autonomously deployed (e.g., by an autonomous vehicle).

In embodiments, the traffic redirection system includes a master node (e.g., master cone 110 of FIG. 1 or master node 212 of FIG. 2) and a plurality of lane nodes (e.g., collectively the first set of cones 115 and second set of cones 117 of FIG. 1 or the lane nodes 216 of FIG. 2). The plurality of lane nodes are deployed in an area where traffic is required to be diverted. For example, the plurality of lane nodes can be configured such that the right lane is shifted to the left lane, and the left lane is shifted to the shoulder of the road. As another example, the plurality of lane nodes can be deployed along a dirt road which is normally not accessed by traffic. However, the plurality of lane nodes can be configured in any other suitable manner.

The master node can be deployed upstream or downstream the lane nodes such that passing autonomous vehicles can be notified of the location of the lane nodes. In embodiments, multiple master nodes can be disposed in all possible directions leading to the lane nodes. This insures that the new lane can be indicated to autonomous vehicles coming from any possible direction.

A determination is then made whether an autonomous vehicle is in proximity of a master node. This is illustrated at operation 315. In some embodiments, if the autonomous vehicle is able to establish a wireless communication with the master node (e.g., the RSSI value between the vehicle and master node is above 0), then a determination is made that the autonomous vehicle is in proximity of the master node. In some embodiments, a determination is made that the autonomous vehicle is in proximity of the master node based on a wireless strength between the autonomous vehicle and master node exceeding a predetermined threshold (e.g., the RSSI value between the vehicle and master node exceeds a threshold RSSI value).

If a determination is made that the autonomous vehicle is not in proximity of the master node, then method 300 terminates. If a determination is made that the autonomous vehicle is in proximity of the master node, then the autonomous vehicle initiates a connection with the master node and receives the location of the new lane from the master node. This is illustrated at operation 320. The location of the new lane can be transmitted as GPS coordinates (e.g., for the start and end of the new lane) or as a route (e.g., a direction and distance to the new lane).

The autonomous vehicle then travels to the location of the new lane as received by the master node. This is illustrated at operation 325. In embodiments, the autonomous vehicle utilizes its existing sensors (e.g., lidar/computer vision) and the routing/GPS information as received by the master node to reach the location of the new lane.

Upon arrival to the new lane, communication is initiated between the lane nodes and the autonomous vehicle. This is illustrated at operation 330. Guidance from the lane nodes is then received. This is illustrated at operation 335. In embodiments, the lane nodes transmit a lane guidance rule set to the autonomous vehicle which temporarily appends to and/or overrides the existing self-driving rules of the autonomous vehicle. The lane guidance rule set dictates the position of the autonomous vehicles with respect to the lane nodes. For example, a user can input a command into each lane node specifying the direction that traffic is supposed to be on. Each lane node can then transmit this direction as a lane guidance rule set to the autonomous vehicle such that the vehicle remains on the correct side of each cone. It is noted that the vehicle can utilize its existing sensors (e.g., lidar, computer vision, sonar, etc.) to aid in traversing the lane.

A determination is then made whether the autonomous vehicle has passed through the lane. This is illustrated at operation 340. For example, if the autonomous vehicle has passed through the last lane node of the lane, then a determination can be made that the vehicle has passed through the lane. In some embodiments, one or more optical sensors can be disposed on the lane nodes such that the vehicle's position within the lane can be accurately determined. As such, if the optical sensors disposed on the lane nodes indicate that the vehicle has passed through the lane, then a determination can be made that the autonomous vehicle has passed through the lane at operation 340.

If a determination is made that the vehicle has not passed through the lane, then operation 340 reverts to operation 335, where lane guidance is continuously received from the lane nodes. If a determination is made that the vehicle passed through the lane, then the communication between the autonomous vehicle and the master and/or lane nodes is severed. This is illustrated at operation 345. This can be completed to ensure that the autonomous vehicle transitions to its existing rule set without guidance from the traffic redirection system. Method 300 then terminates.

The aforementioned operations can be completed in any practical order and are not limited to those described.

Additionally, some, all, or none of the aforementioned operations can be completed, while still remaining within the spirit and scope of the present disclosure. As an example, in embodiments, severance at operation 345 may not occur in response to an explicit command. In these embodiments, the autonomous vehicle may, on its route to its destination, simply travel outside of the wireless communication range of the various nodes described.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
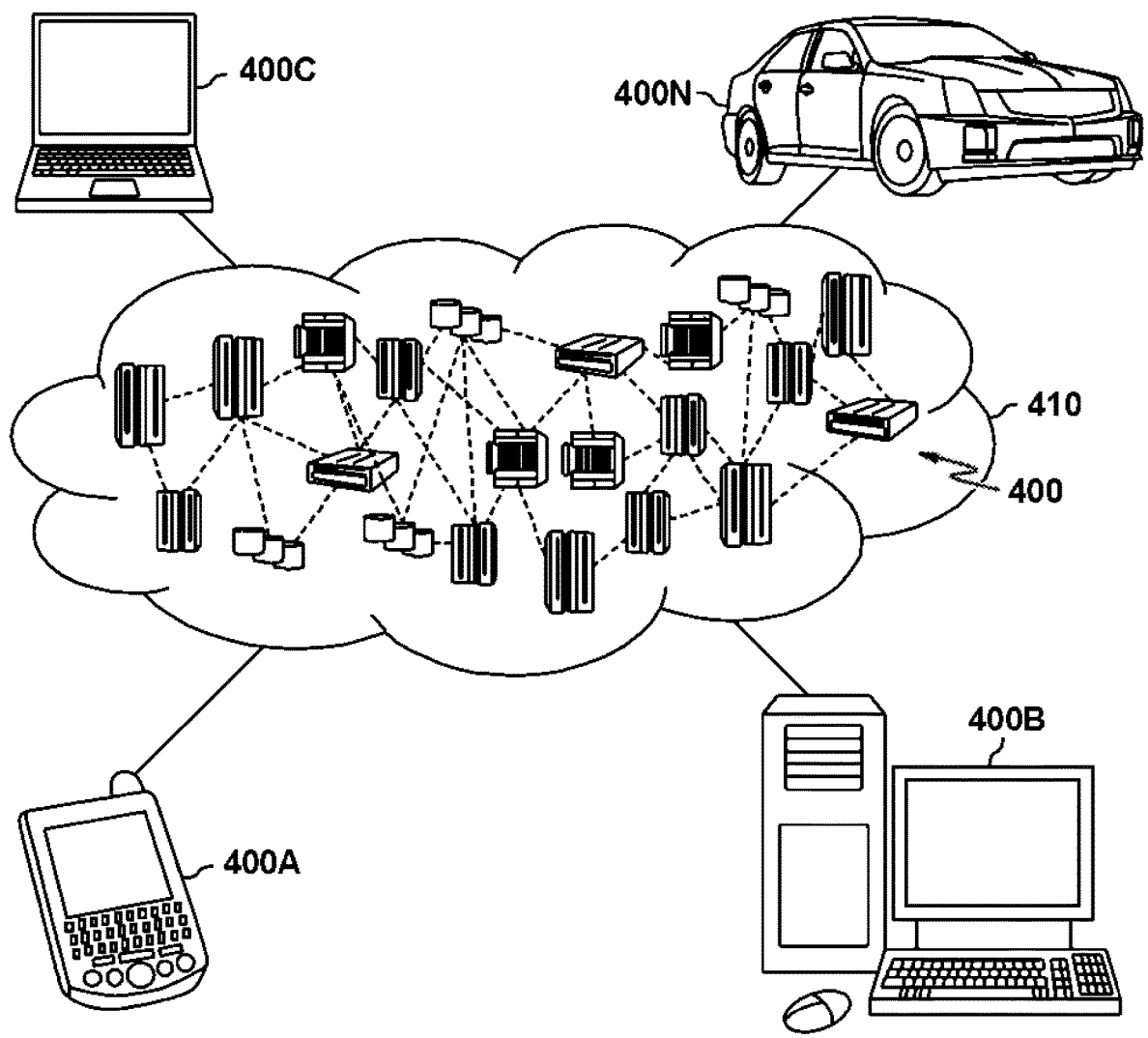
FIG. 4 is a diagram illustrating a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A (e.g., user device 230 of FIG. 2), desktop computer 400B laptop computer 400C (e.g., third party device 240 of FIG. 2), and/or automobile computer system 400N (e.g., vehicle 105 and vehicle 200 of FIGS. 1 and 2, respectively) can communicate. Nodes 400 can communicate with one another. They can be grouped (not shown) physically or virtually, in one or more networks, such as Private, Community, Public, or Hybrid clouds as described hereinabove, or a combination thereof. This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
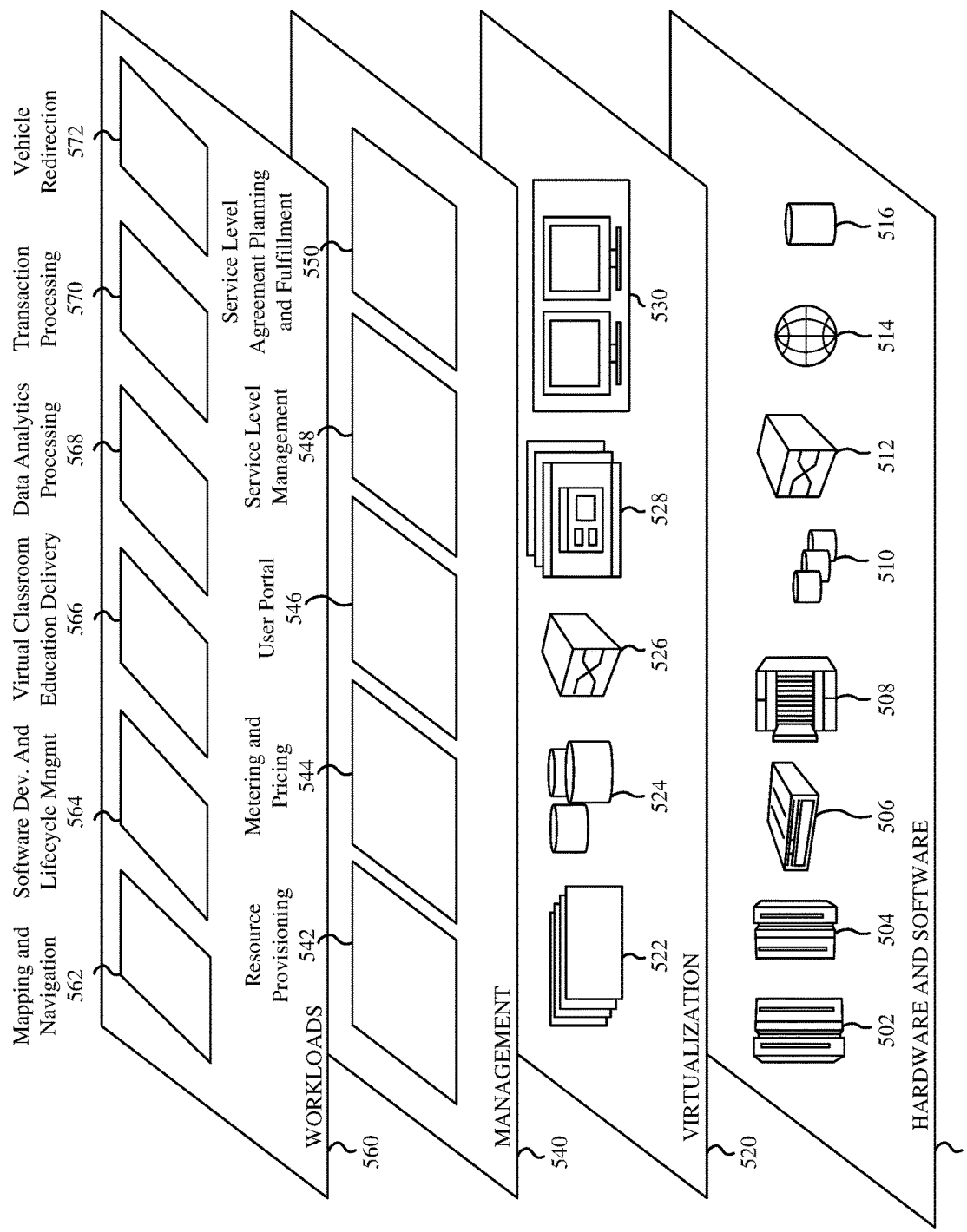
FIG. 5 is a block diagram illustrating abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the disclosure are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities can be provided: virtual servers 522; virtual storage 524; virtual networks 526, including virtual private networks; virtual applications and operating systems 528; and virtual clients 530.

In one example, management layer 540 can provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment can be utilized. Examples of workloads and functions which can be provided from this layer include: mapping and navigation 562; software development and lifecycle management 564; virtual classroom education delivery 566; data analytics processing 568; transaction processing 570; and vehicle redirection 572.

Figure 6:
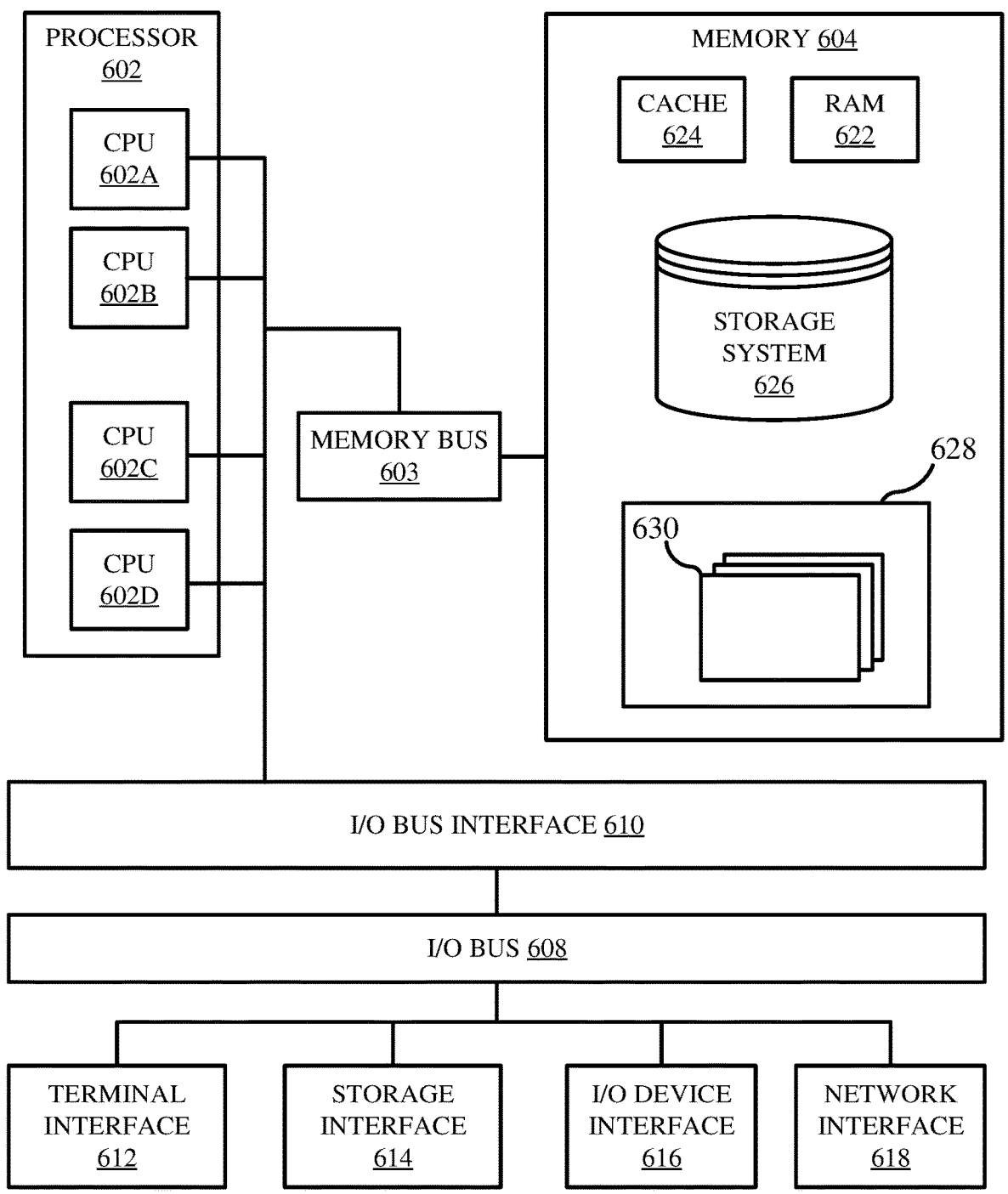
FIG. 6 is a high-level block diagram illustrating an example computer system that can be used in implementing one or more of the methods, tools, and modules, and any related functions, described herein, in accordance with embodiments of the present disclosure.

Referring now to FIG. 6, shown is a high-level block diagram of an example computer system 601 (e.g., vehicle 105, traffic redirection system 210, third party device 240, user device 230, vehicle 200, etc.) that can be used in implementing one or more of the methods, tools, and modules, and any related functions, described herein (e.g., using one or more processor circuits or computer processors of the computer), in accordance with embodiments of the present disclosure. In some embodiments, the major components of the computer system 601 can comprise one or more CPUs 602, a memory subsystem 604, a terminal interface 612, a storage interface 614, an I/O (Input/Output) device interface 616, and a network interface 618, all of which can be communicatively coupled, directly or indirectly, for inter-component communication via a memory bus 603, an I/O bus 608, and an I/O bus interface unit 610.

The computer system 601 can contain one or more general-purpose programmable central processing units (CPUs) 602A, 602B, 602C, and 602D, herein generically referred to as the CPU 602. In some embodiments, the computer system 601 can contain multiple processors typical of a relatively large system; however, in other embodiments the computer system 601 can alternatively be a single CPU system. Each CPU 602 can execute instructions stored in the memory subsystem 604 and can include one or more levels of on-board cache.

System memory 604 can include computer system readable media in the form of volatile memory, such as random access memory (RAM) 622 or cache memory 624. Computer system 601 can further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 can include at least one program product having a set (e.g., at least one) of program modules that are configured to carry out the functions of various embodiments.

One or more programs/utilities 628, each having at least one set of program modules 630 can be stored in memory 604. The programs/utilities 628 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs 628 and/or program modules 630 generally perform the functions or methodologies of various embodiments.

In some embodiments, the program modules 630 of the computer system 601 can include an autonomous vehicle redirection module. The autonomous vehicle redirection module can be configured to initiate communication between an autonomous vehicle and a master node. The autonomous vehicle redirection module can further be configured to receive a location of a new lane from the master node, the new lane comprised of a plurality of lane nodes. The autonomous vehicle redirection module can be configured to dispatch a signal such that the vehicle travels to the location of the new lane. The autonomous vehicle redirection module can then initiate a communication with the plurality of lane nodes and receive guidance through the new lane from the plurality of lane nodes.

Although the memory bus 603 is shown in FIG. 6 as a single bus structure providing a direct communication path among the CPUs 602, the memory subsystem 604, and the I/O bus interface 610, the memory bus 603 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 can, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices can be connected directly to one or more system I/O buses.

In some embodiments, the computer system 601 can be a multi-user mainframe computer system, a single-user system, or a server computer or similar device that has little or no direct user interface, but receives requests from other computer systems (clients). Further, in some embodiments, the computer system 601 can be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components can have greater or lesser complexity than as represented in FIG. 6, components other than or in addition to those shown in FIG. 6 can be present, and the number, type, and configuration of such components can vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method executed by one or more processing circuits of an autonomous vehicle, the method comprising:
    initiating communication with a master node, wherein the communication between the master node and the autonomous vehicle is initiated in response to a received signal strength indicator (RSSI) value between the master node and the autonomous vehicle exceeding an RSSI threshold;
    receiving, from the master node, a location of a new lane, the new lane comprised of a plurality of lane nodes;
    initiating, upon arrival to the location of the new lane, communication with the plurality of lane nodes; and
    receiving guidance facilitating travel through the new lane from the plurality of lane nodes.

2. The method of claim 1, further comprising:
    determining that the autonomous vehicle has passed through the new lane; and
    severing the communication between the plurality of lane nodes and the autonomous vehicle.

3. The method of claim 2, wherein the determination that the autonomous vehicle has passed through the lane is completed based on optical sensor data indicating that the vehicle has passed through the lane.

4. The method of claim 1, wherein the location of the new lane is determined by the master node by using multilateration on signals transmitted between the master node and each of the plurality of lane nodes.

5. The method of claim 1, wherein the location of the new lane is transmitted as a GPS coordinate from at least one lane node of the plurality of lane nodes to the master node.

6. The method of claim 1, where receiving guidance through the new lane from the plurality of lane nodes includes:
    receiving a lane guidance rule set including a set of respective orientations the autonomous vehicle is with respect to respective lane nodes of the plurality of lane nodes at a point in the new lane.

7. The method of claim 1, wherein the location of the new lane is updated on a navigation service.

8. A traffic redirection system comprising:
    a master node; and
    a plurality of lane nodes, wherein the traffic redirection system is configured to perform a method comprising:
        transmitting, by the master node, a location of a new lane to an autonomous vehicle, the new lane comprised of the plurality of lane nodes;
        initiating a communication between the autonomous vehicle and the plurality of lane nodes; and
        guiding, by the plurality of lane nodes, the autonomous vehicle through the new lane by transmitting, to the autonomous vehicle, a lane guidance rule set including a set of respective orientations the autonomous vehicle is with respect to respective lane nodes of the plurality of lane nodes at a point in the new lane.

9. The traffic redirection system of claim 8, wherein the method performed by the traffic redirection system further comprises:
determining that the autonomous vehicle has passed through the new lane; and
severing the communication between the plurality of lane nodes and the autonomous vehicle.

10. The traffic redirection system of claim 9, wherein the determination that the autonomous vehicle has passed through the lane is completed based on optical sensor data indicating that the vehicle has passed through the lane.

11. The traffic redirection system of claim 8, wherein the communication between the master node and the autonomous vehicle is initiated in response to a received signal strength indicator (RSSI) value between the master node and the autonomous vehicle exceeding zero.

12. The traffic redirection system of claim 8, wherein the location of the new lane is determined by the master node by using a time difference of arrival (TDOA) multilateration on signals transmitted between the master node and each of the plurality of lane nodes.

13. The traffic redirection system of claim 8, wherein the location of the new lane is transmitted as a GPS coordinate from at least one lane node of the plurality of lane nodes to the master node.

14. The traffic redirection system of claim 8, where the lane guidance rule set appends to an existing self-driving rule set the autonomous vehicle is executing.

15. A computer program product comprising a computer readable storage medium having program instructions embodied therewith, wherein the computer readable storage medium is not a transitory signal per se, the program instructions executable by one or more processing circuits of an autonomous vehicle to cause the one or more processing circuits to perform a method comprising:
initiating communication with a master node;
receiving, from the master node, a location of a new lane, the new lane comprised of a plurality of lane nodes;
initiating, upon arrival to the location of the new lane, communication with the plurality of lane nodes; and
receiving guidance facilitating travel through the new lane from the plurality of lane nodes by receiving a lane guidance rule set including a set of respective orientations the autonomous vehicle is with respect to respective lane nodes of the plurality of lane nodes at a point in the new lane.

16. The computer program product of claim 15, further comprising:
determining that the autonomous vehicle has passed through the new lane; and
severing the communication between the plurality of lane nodes and the autonomous vehicle.

17. The computer program product of claim 15, where the lane guidance rule set overrides a portion of self-driving instructions the autonomous vehicle is currently executing.

\* \* \* \* \*